(12) United States Patent
Kocher et al.

(10) Patent No.: US 11,423,799 B2
(45) Date of Patent: Aug. 23, 2022

(54) SYSTEMS AND METHODS FOR GENERATING CUSTOM ASSEMBLY INSTRUCTIONS FOR PRODUCT PACKAGES

(71) Applicant: Rockwell Automation Technologies, Inc., Mayfield Heights, OH (US)

(72) Inventors: Kyle Kocher, Milwaukee, WI (US); Kelly M. Kunowski, Milwaukee, WI (US); Mason Khan, Milwaukee, WI (US); James Furukawa, Milwaukee, WI (US); Troy M. Bellows, Milwaukee, WI (US); Scott B. Lasko, Milwaukee, WI (US); Mayo D. Hemmingson, Milwaukee, WI (US); Charles L. Quentin, Milwaukee, WI (US); Anthony M. Avila, Milwaukee, WI (US); Austen K. Scudder, Milwaukee, WI (US); Karen R. Hecht, Milwaukee, WI (US); Juerg Merki, Aarau (CH); Guillermo Garcia, Milwaukee, WI (US); Maciej Branicki, Katowice (PL)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 263 days.

(21) Appl. No.: 16/503,184

(22) Filed: Jul. 3, 2019

(65) Prior Publication Data

US 2021/0005103 A1  Jan. 7, 2021

(51) Int. Cl.
*G09B 19/00* (2006.01)
*G09B 5/02* (2006.01)
(Continued)

(52) U.S. Cl.
CPC .............. *G09B 19/003* (2013.01); *G09B 5/02* (2013.01); *G09B 5/04* (2013.01); *G09B 5/065* (2013.01); *G06F 3/0482* (2013.01)

(58) Field of Classification Search
CPC ...................... G06T 2219/2008; G06F 3/0482
See application file for complete search history.

(56) References Cited

U.S. PATENT DOCUMENTS

| 8,860,717 B1 * | 10/2014 | Zeiger ................... G06T 15/503 345/419 |
| 2003/0197700 A1 * | 10/2003 | Tanaka .................... G06T 19/20 345/419 |

(Continued)

FOREIGN PATENT DOCUMENTS

| WO | WO-2020209833 A1 * | 10/2020 | ........... G06Q 10/101 |

OTHER PUBLICATIONS

Makris, Sotiris, et al., Assembly support using AR technology based on automatic sequence generation, CIRP Annals, vol. 62, Issue 1, 2013, pp. 9-12 (Year: 2013).*

(Continued)

*Primary Examiner* — Jason T Yen
(74) *Attorney, Agent, or Firm* — Fletcher Yoder, P.C.

(57) ABSTRACT

A method for generating assembly instructions may include receiving inputs from a user, such that the inputs may include an indication of components of a product package. The method may also include retrieving assembly attribute data for each component from a first storage component, such that the assembly attribute data includes information regarding compatibility properties between two or more of the plurality of components. The method may then involve retrieving model data for each component from a second storage component, such that the model data is representative of physical properties of a respective component. The method may also include generating the assembly instructions for assembling the components together based on the attribute data and the model data, such that the assembly instructions include visualizations representative of at least a portion of a process for assembling the plurality of (Continued)

components together. The assembly instructions are then presented via an electronic display.

19 Claims, 7 Drawing Sheets

(51) Int. Cl.
  *G09B 5/06* (2006.01)
  *G09B 5/04* (2006.01)
  *G06F 3/0482* (2013.01)

(56) References Cited

U.S. PATENT DOCUMENTS

| | | | |
|---|---|---|---|
| 2008/0228450 A1* | 9/2008 | Jakobsen | G06T 17/10 |
| | | | 703/2 |
| 2014/0118358 A1* | 5/2014 | Enomoto | G06T 19/20 |
| | | | 345/473 |
| 2015/0221021 A1* | 8/2015 | Shakes | G06Q 99/00 |
| | | | 705/26.81 |
| 2016/0314704 A1* | 10/2016 | Bell | G06Q 50/01 |
| 2017/0352282 A1* | 12/2017 | Anderson | H04N 9/045 |
| 2018/0061255 A1* | 3/2018 | Ekambaram | G06F 16/44 |

OTHER PUBLICATIONS

Chen, Wen-Chin, et al., A three-stage integrated approach for assembly sequence planning using neural networks, Expert Systems with Applications, vol. 34, Issue 3, 2008, pp. 1777-1786 (Year: 2008).*

* cited by examiner

← 70

BUL. 140G CIRCUIT BREAKER ASSEMBLY INSTRUCTION CONFIGURATOR

SELECT COMPONENTS AND ACCESSORIES THAT WILL BE ASSEMBLED TOGETHER, CONFIGURE AND DOWNLOAD STEP-BY-STEP INTERACTIVE VIRTUAL INSTRUCTION SHEET:

- ☐ NO/NC AUXILIARY CONTACT(S)
- ☐ ALARM CONTACT
- ☐ TRIP UNIT ALARM CONTACT
- ☐ SHUNT TRIP
- ☐ UNDERVOLTAGE RELEASE
- ☐ MOLDED CASE CIRCUIT BREAKER TRIP UNIT, 125A, H – FRAME, T/M OR ELT
- ☐ MECHANICAL LUGS - CU
- ☐ MECHANICAL LUGS - CU/Al
- ☐ MECHANICAL LUGS - MULTI-TERMINAL CU/Al
- ☐ EXTENDED FRONT TERMINALS
- ☐ SPREADER TERMINALS
- ☐ PHASE BARRIERS
- ☐ LOW TERMINAL COVER
- ☐ HIGH TERMINAL COVER
- ☐ FRAMES H,J, DIN ADAPTER, 3/4 POLE
- ☐ MCS STANDARD BUSBAR MOUNTING ADAPTER
- ☐ 140G CIRCUIT BREAKER METAL HANDLE
- ☐ 140G CIRCUIT BREAKER NONMETALLIC HANDLE
- ☐ 140G CIRCUIT BREAKER STAINLESS HANDLE
- ☐ FRAMES H,J, VARIABLE-DEPTH MECH HANDLE
- ☐ FRAME-H-J, DIRECT ROTARY HANDLE, BLACK
- ☐ FRAME-H-J, DIRECT ROTARY HANDLE, RED/YELLOW
- ☐ FRAME-H-J, MOTOR OPERATOR

[ CLICK HERE FOR CUSTOMIZED INSTALLATION INSTRUCTIONS ]

*FIG. 3*

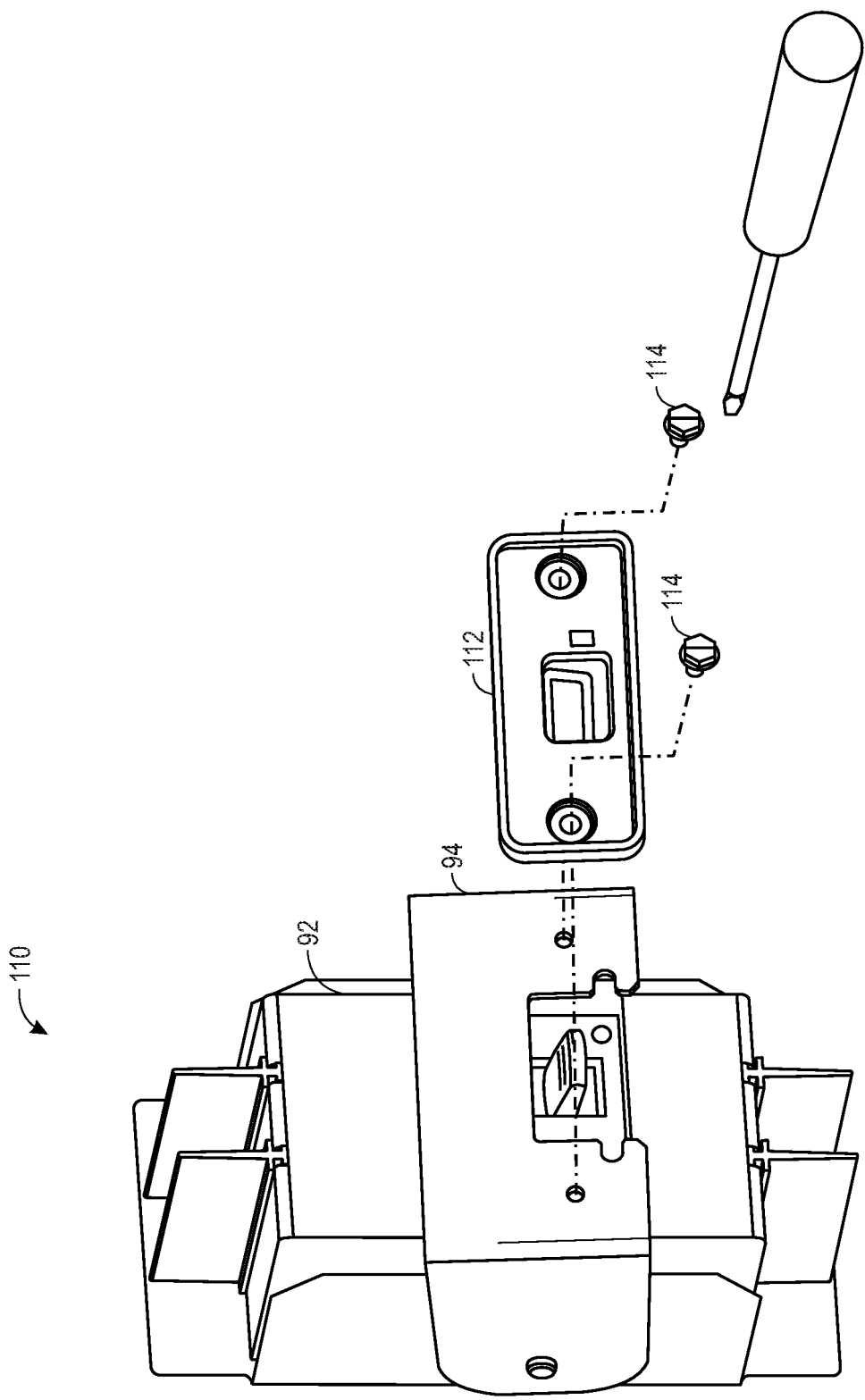

SYSTEMS AND METHODS FOR GENERATING CUSTOM ASSEMBLY INSTRUCTIONS FOR PRODUCT PACKAGES

BACKGROUND

The present disclosure generally relates to systems and methods for generating assembly instructions for various product assembly combinations. More specifically, the present disclosure is related to generating custom assembly instruction video or visual guide for particular product packages that include a particular set of products or components.

The number of different products, components, machines, and computing devices that are employed in an industrial automation system is enormous. In addition to the vast quantity of products used in the industrial automation system, different products or components interact or are assembled with different configurable products or components according to a particular order, a particular assembly, or the like. Different products or components generally have instructional sheets or documentation that describe how the respective product or component is assembled. Often times, to accommodate a wide variety of customers that may use each product or component in a variety of different arrangements, the instructional sheet may include a number of different scenarios that describe how the respective product may be assembled with other configurable (e.g., counterpart) products or accessories. However, each customer provided with the instructional documentation may not have the need for certain scenarios provided in the instructional documentation. In this case, the additional material may cause personnel to incorrectly assemble products or may create confusion among the personnel with regard to how to efficiently assemble the products.

Moreover, in some situations, the instructional documentation may not include instructions for assembling a particular product in a certain arrangement that the customer wishes to employ. That is, the instructional documentation may cover a certain number of scenarios, but the documentation may not practically cover all of the possible scenarios that may be employed by a customer. As such, it is recognized that improved systems and methods for generating customer assembly instructions for various types of product packages are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory computer-readable medium may include computer-executable instructions that, when executed, cause a processor to receive one or more inputs from a user, such that the or more inputs may include an indication of a plurality of components of a product package. The processor may then retrieve assembly attribute data for each component of the plurality of components from a first storage component, such that the assembly attribute data may include information regarding compatibility properties between two or more of the plurality of components. The processor may then retrieve model data for each component of the plurality of components from a second storage component, such that the model data is representative of one or more physical properties of a respective component of the plurality of components. The processor may then generate assembly instructions for assembling the plurality of components together based on the assembly attribute data and the model data, such that the assembly instructions may include one or more visualizations representative of at least a portion of a process for assembling the plurality of components together. The processor may then display the assembly instructions via an electronic display.

In another embodiment, a method for generating assembly instructions may include receiving inputs from a user, such that the inputs may include an indication of components of a product package. The method may also include retrieving assembly attribute data for each component from a first storage component, such that the assembly attribute data includes information regarding compatibility properties between two or more of the plurality of components. The method may then involve retrieving model data for each component from a second storage component, such that the model data is representative of physical properties of a respective component. The method may also include generating the assembly instructions for assembling the components together based on the attribute data and the model data, such that the assembly instructions include visualizations representative of at least a portion of a process for assembling the plurality of components together. The assembly instructions are then presented via an electronic display.

In yet another embodiment, a system for generating assembly instructions may include at least one database that may store assembly attribute data for each component of a plurality of components of a product package being assembled, along with model data for each component of the plurality of components, such that the model data is representative of one or more physical properties of a respective component of the plurality of components. The system may also include a computing device that may receive one or more inputs from a user, such that the one or more inputs may include an indication of the plurality of components of the product package. The computing device may then retrieve the assembly attribute data for each component of the plurality of components from the at least one database, retrieve model data for each component of the plurality of components from the at least one database, and generate the assembly instructions for assembling the plurality of components together based on the assembly attribute data and the model data, such that the assembly instructions comprise one or more visualizations representative of at least a portion of a process for assembling the plurality of components together. The computing device may then display the assembly instructions via an electronic display.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 illustrates an example a product component selection visualization for use in the method for generating custom assembly content of FIG. 2, in accordance with an embodiment;

FIG. 7 is an example subsequent visualization that may be part of an instructional video for assembling products of a product package, in accordance with an embodiment.

DETAILED DESCRIPTION

Figure 1:
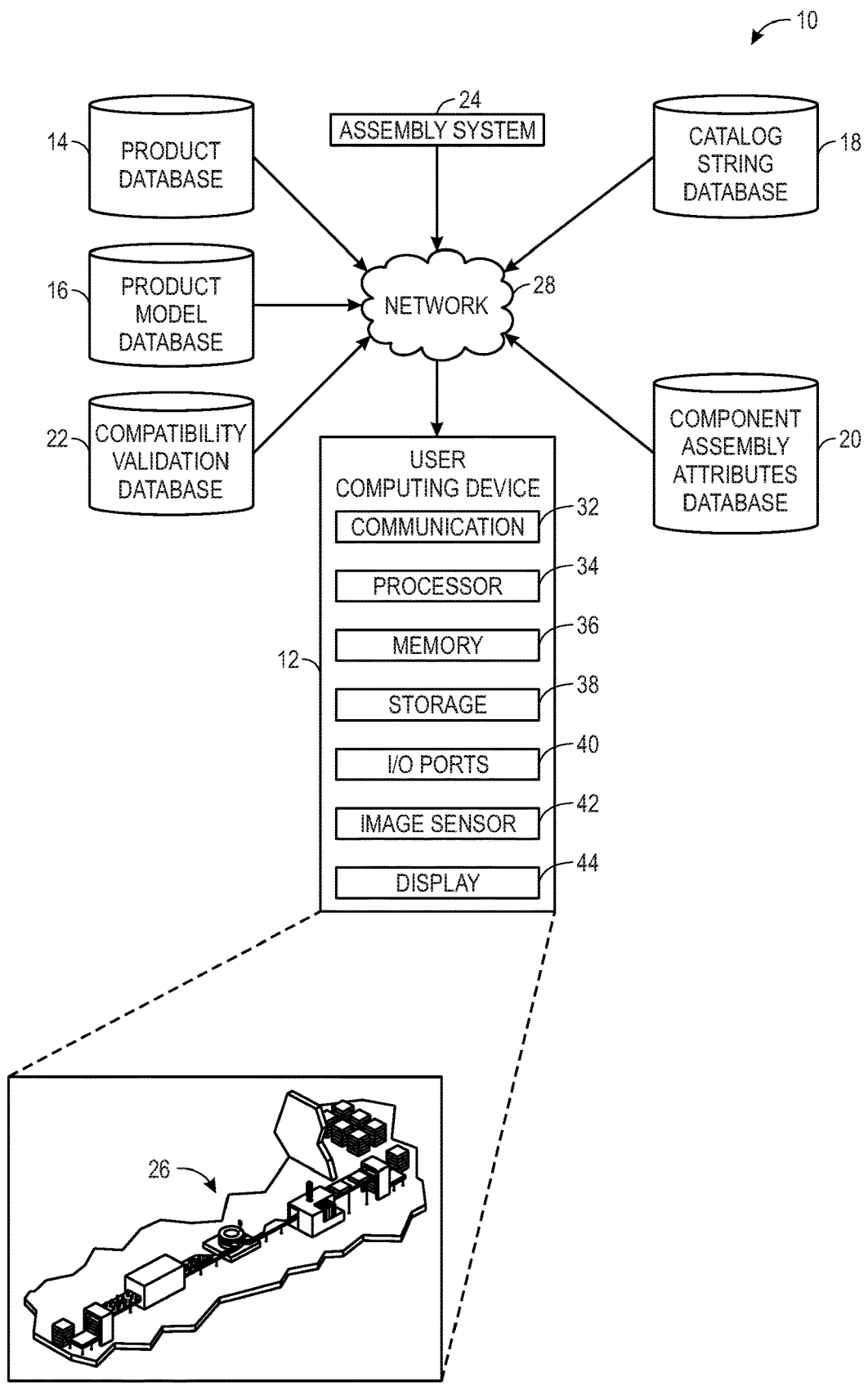
FIG. 1 illustrates an assembly configuration system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed above, the number of unique combination of component, parts, products, and accessories that a given industrial automation system may employ makes it increasingly difficult to generate accurate and comprehensive assembly instructions for every suitable combination of components, parts, products, and accessories. That is, a client may purchase a product package that may include a collection of certain products, components, accessories, and the like. The collection of products may be specifically selected to suit the industrial automation system operated by the client. Given the vast number of products, components, and accessories that are available in the industrial automation industry, it is impractical to create assembly instructions for each individual product, component, or accessory, while including assembly instructions for other configurable (e.g., counterpart) products and/or accessories. In other words, since the number of possible configurations of different products is so large, it is not practical to anticipate each possible combination of products and/or accessories and provide the related assembly instructions for each possible combination.

Moreover, even if assembly instructions were generated for a limited number of possible product combinations, the inclusion of these instructions may confuse the clients that do not use those particular combination. With this in mind, the presently disclosed embodiments detail certain systems and methods for automatically generating custom assembly instructions for a group of products, components, and or accessories that may be included in a particular product package purchased or being assembled by a client. Additional details with regard to the process for creating these custom assembly instructions is provided below with reference to FIGS. 1-7.

By way of introduction, FIG. 1 illustrates an assembly configuration system 10 that includes a number of devices that may be utilized to generate the custom assembly instructions. For instance, the assembly configuration system 10 may include a user computing device 12, a product database 14, a product model database 16, a catalog string database 18, a component assembly attributes database 20, a compatibility validation database 22, an assembly system 24, an industrial automation system 26, and the like. In certain embodiments, the user computing device 12 may receive a request to generate custom assembly instructions for a particular set of products (e.g., product package) that are to be installed within the industrial automation system 26. Based on the product package, the user computing device 12 may retrieve data regarding each product in the product package from the product database 14 or the catalog string database 18, model data for each product in the product package from the product model database 16, assembly attributes for each product in the component assembly attributes database 20, and the like. The user computing device 12 may then generate a custom set of assembly instructions to guide a user with regard to assembling or installing each product of the product package. The custom assembly instructions may consider the order in which each product or component should be installed to minimize the amount of time undertaken to assemble the complete product package. Additional details with regard to generating the custom assembly instructions will be discussed below with reference to FIGS. 2-8.

The user computing device 12 may include any suitable computing device including a general purpose computer, a laptop computer, a mobile computing device, a tablet computing device, an electronic glass computing device, and the like. The user computing device 12 may communicate with the various databases and the assembly system 24 mentioned above via a network 28. The network 28 may facilitate communication between devices and databases using various communication protocols, such as Ethernet/IP®, ControlNet®, DeviceNet®, or any other industrial communication network protocol. Alternatively, the network 28 may facilitate communication of various device via different wired or wireless communication protocols, such as Wi-Fi, mobile telecommunications technology (e.g., 2G, 3G, 4G, LTE, 5G), Bluetooth®, near-field communications technology, and the like.

In certain embodiments, the user computing device 12 may interact with the assembly system 24 to generate the custom assembly instructions via the network 28 or the like. As such, the assembly system 24 may include a computing device similar to that of the user computing device 12. In addition, the assembly system 24 may be implemented using a cloud computing system that may leverage the processing power of multiple computing systems to efficiently process data to generate the custom assembly instructions. With this in mind, it should be noted that the following description of the process for generating the custom assembly instructions may be performed by the user computing device 12, the assembly system 24, or any other suitable computing device.

In addition to the assembly system 24, the network 28 may be communicatively coupled to the product database 14, the product model database 16, the catalog string database 18, the component assembly attributes database 20, and the compatibility validation database 22. The product database 14 may include data regarding a variety of industrial automation components that may be used in the industrial automation system 26. The data may include information such as specification details, configuration settings, product serial numbers, warranty information, and the like.

Each of the products listed in the product database 14 may include a corresponding physical model that may be stored in the product model database 16. For example, the product model database 16 may include data files that represent a two or three-dimensional diagram that details the dimensions and structure of the respective product. In some embodiments, the model data may be used to generate a number of viewing angles for the custom assembly instructions to help illustrate how the product may be assembled or coupled to a configurable or counterpart product or component. In addition, the model data may be used to generate a video that simulates how the product is assembled or coupled to the configurable or counterpart product or component. As used herein, configurable or counterpart products or components may be any suitable product, part, or component that may be assembled to, coupled to, installed with, or attached to a respective product or component.

In certain embodiments, the user computing device 12 may receive a request to generate custom assembly instructions for a list of products that have been specified by the user. To generate the list of products, the user computing device 12 may receive certain input from the user that indicates a technology area, a facility type, a product category, or the like, such that the user computing device 12 may present the user with a list of products that the user may assemble. In response to receiving the information that describes the type of products that the user is assembling, the user computing device 12 may then identify the products that correspond to the specified type or subset of products that may be employed in the industrial automation system 26 based on the data stored in the product database 14. The user computing device 12 may then present the list of products that correspond to the selected product type and receive inputs that indicate which particular products that the user intends to assemble. The product database 14 may include additional details regarding each product such as specific serial numbers or configurations for the product, matching counterpart products, accessories (e.g., hardware) used for assembling the product, software related to operating the product, or the like.

Additionally, the user computing device 12 may retrieve model data for each of the products listed by the user to generate the custom assembly instructions for the listed products. The model data may be interpreted by certain software to present two or three-dimensional objects representative of the respective product. As such, the model data include dimensional data regarding the physical properties of the product. In addition, the model data may include metadata that indicates how the product may connect or couple to other products. For example, the metadata may include a list of counterpart products that can be used with the respective product, a list of type of connectors that may interface with the ports of the respective product, and the like.

In addition to presenting a list of possible products that the user may intend to assemble, the user computing device 12 may also receive a product package identifier that may represent a number of products or components that the user has purchased or intends to assemble together. The product package identifier may be stored in the catalog string database 18, which may provide a list of products associated with each product package identifier. In this way, after a user purchases a suite of products, the user may provide the user computing device 12 with the product package identifier to enable the user computing device 12 to ascertain the exact list of products that the user intends to assemble.

The components assembly attributes database 20 may include data that details how various products or components interact or couple with other counterpart products. As such, the component assembly attributes database 20 may include information related to the type of connectors to use between products or components, the position of certain products or components with respect to the counterpart products or components, an order in which certain products are to be assembled, compatibility properties between products and components, and the like. In addition, the components assembly attributes database 20 may include a set of assembly instructions for different pairs of components that may be coupled to each other. The set of assembly instructions may include metadata that indicates how the respective model data for the pair of components are to be connected to each other. The set of assembly instructions may also include text or audio that describes how the components are connected to each other.

The compatibility validation database 22 may include data that assists the user computing device 12 to determine whether the custom assembly instructions accurately details connections between products and components. As such, the compatibility validation database 22 may include feedback data from other users that indicate whether problems or issues arise when assembling or connecting certain products together that would otherwise appear to be compatible based on the data stored in the component assembly attributes database 20. In some embodiments, the compatibility validation database 22 may also include an indication that certain products or components that are to be coupled together as per the custom assembly instructions have been verified by a third-party software or person. That is, after the custom assembly instructions for a product package or list of products is generated, a separate software or individual may validate that the connecting components do connect to each other.

As mentioned above, the products or product package received by the user computing device 12 may include devices that may be installed at the industrial automation system 26. The industrial automation system 26 may represent a collection of industrial automation components and machines for any suitable industry. The industrial automation components may include one or more devices that may control and/or monitor the operations the machines within the industrial automation system. The industrial automation components may thus include controllers, input/output (I/O) modules, motor control centers, motors, human machine interfaces (HMIs), operator interfaces, contactors, starters, sensors, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like. The products or components that may be installed at the industrial automation system 26 may include mounting components (e.g., brackets), wiring components (e.g., cables), and other suitable components that may enable certain products to be positioned within the industrial automation system 26 and operate within the industrial automation system 26.

With the foregoing in mind, to perform the various processes described herein, the user computing device 12 may include certain components that enable it to operate. For example, the user computing device 12 or other suitable computing device described herein may include a communication component 32, a processor 34, a memory 36, a storage component 38, input/output (I/O) ports 40, an image sensor 42, a display 44, and the like. The communication component 32 may enable the user computing device 12 to communicate data via the network 28 or other suitable communication medium. The communication component 32 may include a network interface that may enable the user computing device 12 to communicate via various protocols such as Ethernet/IP®, ControlNet®, DeviceNet®, or any other industrial communication network protocol. Alternatively, the communication component 32 may enable the user computing device 12 to communicate via various wired or wireless communication protocols, such as Wi-Fi, mobile telecommunications technology (e.g., 2G, 3G, 4G, 5G, LTE), Bluetooth®, near-field communications technology, and the like.

The processor 34 may be any type of computer processor or microprocessor capable of executing computer-executable code. The processor 34 may also include multiple processors that may perform the operations described below. The memory 36 and the storage component 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. Generally, the processor 34 may execute software applications that include programs that enable a user provide input to the user computing device 12 and display visualizations that represent the generated custom assembly instructions.

The memory 36 and the storage component 38 may also be used to store data, analyze data, store software applications, and the like. The memory 36 and the storage component 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse), sensors, input/output (I/O) modules, and the like. I/O modules may enable the user computing device 12 or other suitable computing device to communicate with other devices in the industrial automation system via the I/O modules.

The image sensor 42 may include any image acquisition circuitry such as a digital camera capable of acquiring digital images, digital videos, or the like. The display 44 may depict visualizations associated with software or executable code being processed by the processor 34. In one embodiment, the display 44 may be a touch display capable of receiving inputs from a user of the user computing device 12. As such, the display 44 may serve as a user interface to communicate with the software executed by the processor 34, the assembly system 24, or the like. The display 44 may be any suitable type of display, such as a liquid crystal display (LCD), plasma display, or an organic light emitting diode (OLED) display, for example.

Although the components described above have been discussed with regard to the user computing device 12, it should be noted that similar components may make up other computing devices described herein. Further, it should be noted that the listed components are provided as example components and the embodiments described herein are not to be limited to the components described herein.

Figure 2:
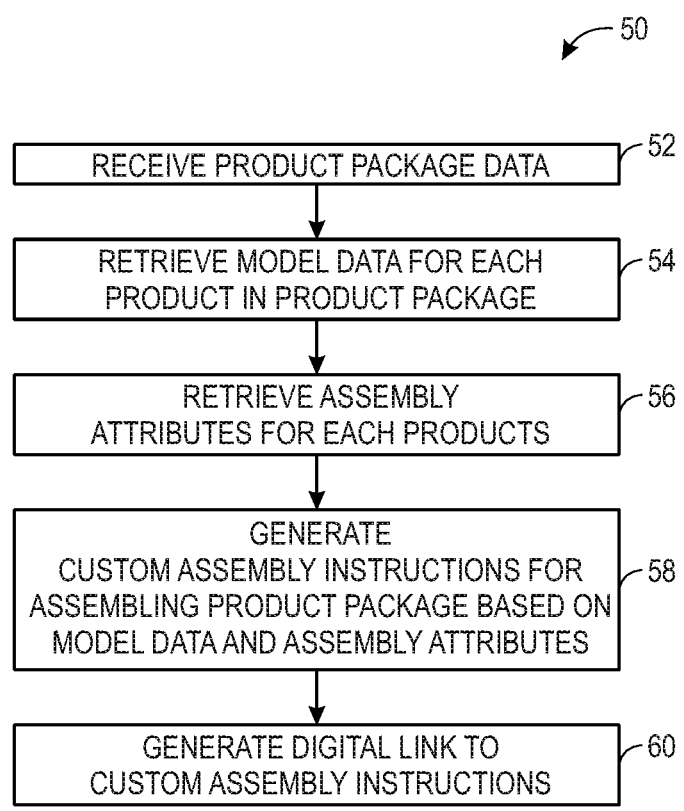
FIG. 2 illustrates a flow chart of a method for generating custom assembly content for a product package, in accordance with an embodiment.

With the foregoing in mind, the user computing device 12 may be used to generate custom assembly instructions for a particular set of products identified by the user. By way of example, FIG. 2 illustrates a flow chart of a method 50 for generating custom assembly instructions for a product package, in accordance with embodiments described herein. Although the method 50 is described as being performed by the user computing device 12, it should be noted that any suitable computing device may perform the method 50. Additionally, although the method 50 is described as being performed in a particular order, it should be understood that the method 50 may be performed in any suitable order.

Referring now to FIG. 2, at block 52, the user computing device 12 may receive product package data from the user. The product package data from via input from a user. The product package data may specify one or more products that the user intends to assemble. The product package may include accessories, such as brackets, mounts, and other suitable components that may interface with a product. In some embodiments, the product package may be specified by the user based on selections identified via a list of products presented to the user on the display 44.

By way of example, FIG. 3 illustrates an example visualization 70 that may be presented to the user via the display 44. As shown in FIG. 3, the visualization 70 may include a list of components that the user may select as being part of the product package. In some embodiments, the user computing device 12 may receive a category or product type from the user and generate a list of components and accessories that may be associated with the specified category or product type. That is, the category or product data provided to the user computing device 12 may be used to query the product database 14 to identify components that may be related to the category or product data. The identified components may be populated on a list to present via the display 44. Referring to the example visualization 70 of FIG. 3, the components that may be presented for a circuit breaker assembly may include a variety of different types of contacts, a shunt trip, different types of relays, various connector hardware (e.g., lugs), different electrical interfaces (e.g., terminal blocks), mechanical components (e.g., barrier, handle), and the like. After the user computing device 12 receives a selection of components from the list of components or accessories, the user computing device 12 may proceed to block 54.

In some embodiments, at block 52, the user computing device 12 may receive the product package data in the form of a catalog string, as described above. The catalog string may correspond to a code or identifier that specifies a list of components and/or accessories that may be part of the product package. As discussed above, the user computing device 12 may query the catalog string database 18 to identify the product package that corresponds to the catalog string provided to the user computing device 12.

At block 54, the user computing device 12 may retrieve model data for each component and/or accessory that is part of the product package data. The model data for each component and/or accessory may be stored in the product model database 16. The model data may include three-dimensional representations of each component of the product package, such that the user computing device 12 may generate images or videos to create the custom assembly instructions for the product package.

At block 56, the user computing device 12 may retrieve assembly attributes for each component that is part of the product package from the component assembly attributes database 20. The assembly attributes may specify how different components may interface with each other, the tools that may be used to fasten or connect components together, and the like. In one embodiment, the assembly attributes may include details regarding the type of connectors that are to be employed to connect two components, physical dimensions that detail how certain mechanical parts may fit into certain cavities, particular mounts or brackets that are to be connected to the respective component, and the like. In some embodiments, the assembly attributes may be included as metadata in the model data.

In any case, after receiving the model data and the assembly attribute data for each component of the product package, at block 58, the user computing device 12 may generate the custom assembly instructions for the product package. The custom assembly instructions for the product package may be generated by evaluating each of the components that are included in the product package and relationships between components with respect to the assembly attributes. That is, the assembly attributes may define a certain set of components that interface or connect to the respective component. Based on the components that are part of the product package, the user computing device 12 may identify the present components that may be connected together according to the assembly attributes. Additional details with regard to generating the custom assembly instructions will be provided below with reference to FIG. 4.

Figure 4:
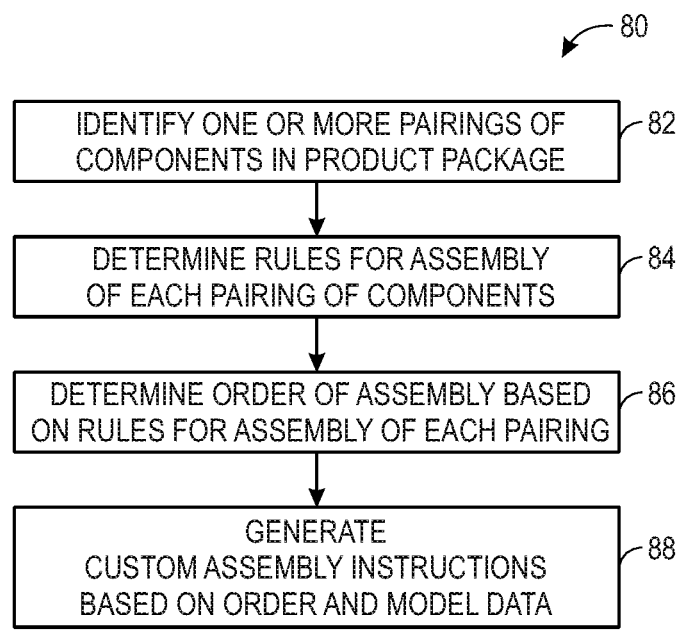
FIG. 4 illustrates a flow chart of a method for generating the custom assembly content for the product package based on data pertaining to products of the product package, in accordance with an embodiment.

Referring briefly to FIG. 4, the user computing device 12 may generate the custom assembly instructions according to the method 80. As such, at block 82, the user computing device 12 identifies one or more pairings of products or components in the product package. That is, the user computing device 12 may analyze the assembly attributes of each component to identify counterpart or connecting components that may be connected to the respective component. As mentioned above, the assembly attributes may provide information regarding how different components connect to each other. For example, the assembly attributes may indicate an orientation of a component when it is inserted or coupled to another component. The assembly attributes may provide details regarding types of hardware (e.g., screws, nuts) to use to secure the connection between two components. The assembly attributes may also provide an indication regarding clearances or space that is to be provided for the respective assembled component.

At block 84, the user computing device 12 may determine rules for the assembly of each paired components. The assembly attributes may provide rules and exemptions for allowing two or more components to connect to each other. The rules may indicate that certain components may couple to each other for particular purposes, may specify certain space requirements between two connecting components or between two assemblies of components, and the like. In some embodiments, the rules provide provisions in which certain components are allowed or not allowed to be assembled together. For instance, the rules may specify that the two adjoining components be rated for the same electrical properties (e.g., current, voltage), clearance (e.g., space) amounts, material (e.g., metal), and other provisions that may designate conditions in which two or more components are to be allowed to connect or couple to each other.

In addition to rules for connecting components, it should be noted that the assembly attributes may include exemptions that may provide information related to circumstances (e.g., certain product packages, collection of components) that correspond to when certain rules do not apply to the connection of certain components. In addition, the exemptions may also provide an indication with regard to when spacing requirements or other rules determined at block 84 may be omitted for assembling the product package or certain components within the product package.

In addition to the rules and exemptions, at block 86, the user computing device 12 may determine an order in which the components of the product package are to be assembled or coupled to each other. In some embodiments, the assembly attributes may designate an order in which each component is to be secured or placed prior to two or more components being coupled together. That is, the assembly attributes may indicate that component A may couple to component B but using component C as an intermediary component to secure the connection between components A and B.

At block 88, the user computing device 12 may generate the custom assembly instructions based on the rules, the order of assembly, and the model data acquired at block 54 of the method 50. That is, referring back to block 58 of FIG. 2, the custom assembly instructions may be generated to illustrate how the components of the product package may be assembled together with respect to the rules for assembling various components, the order in which certain pairings of components are assembled, and the model data that represents each respective component of the assembly. In some embodiments, the custom assembly instructions may include document that provides text instructions and accompanying images (e.g., acquired via the model data) that illustrate how certain components connect to each other.

In some embodiments, the assembly attributes may include metadata related to the text for describing how two components are to be connected to each other. Along with a particular text that describes a certain step or part of the process for assembling two components together, the user computing device 12 may retrieve model data for the two components and generate a visualization that illustrates the respective step. As such, the visualization may include two or more illustrations or depictions of the components before and after they are connected to each other to help the user understand how they may be connected.

When presenting the custom assembly instructions, the user computing device 12 may display a plurality of visualizations in a particular order to illustrate a step-by-step process for assembling the product package. In some embodiments, the user computing device 12 may receive an input from the user that requests that the user computing device 12 proceed to the next step and display a visualization that is representative of a subsequent portion of the process for assembling the product package. In the same manner, the user computing device 12 may receive an input requesting that the previous portion of the process for assembling the product package is displayed. Additionally, the user computing device 12 may display a video that animates the model versions of the components of the product package being assembled together. The video may also by paused by way of input received by the user computing device 12. Moreover, the user may interact with the video or visualizations presented via the display 44 to view different angles, scaled versions (e.g., zooming in, zooming out) of the visualizations, rotated views (e.g., 360-degree rotation), and the like.

In addition, the user computing device 12 may receive input from users concerning the assembly attributes related to particular components or the like. That is, while users assemble or combine certain components, the user may provide input that clarifies or further describes a particular procedure or operation related to connecting or assembling two or more components. The input may be incorporated into the assembly attributes for the component and stored in the component assembly attributes database 20. As such, the user computing device 12 may provide more complete or comprehensive instructions for assembling the respective components during a subsequent operation in which the user computing device 12 generates custom assembly instructions for the respective components.

In some embodiments, the user computing device 12 may generate the custom assembly instructions as a video that animates the connection of two components. The animation may also be accompanied by audio that may describe how the two components may be assembled or coupled together. Like the text instructions described above, the audio instructions may be stored as metadata part of the assembly attributes. It should be noted that the metadata that includes data describing how a respective component may be coupled to another component may include a pointer or link to a database or other storage component that may store the text or audio data. In this way, the assembly attributes may be accessed more efficiently without delay from loading the instructional data, which may take longer for the user computing device 12 to load due to its respective size. The generated custom assembly instructions may be stored in the storage component 38, a database, or some other suitable storage component.

At block 60, the user computing device 12 may generate a digital link to access the custom assembly instructions. The digital link may provide a pointer or address that allows the user computing device 12 to access the custom assembly instructions. As such, the digital link may be a machine-readable image (e.g., QR code) that connects the user computing device 12 to a web site, server, database, or other storage medium that may host the custom assembly instructions. In any case, the digital link may enable the user computing device 12 or any other suitable device to access the custom assembly instructions.

It should be noted that the custom assembly instructions may be stored in a remote server or database to preserve memory within the user computing device 12. Moreover, it should be noted that one or more of the blocks of the methods 50 and 80 may be performed using a separate computing device (e.g., cloud computing system, assembly system 74) to preserve the processing power of the user computing device 12. For example, the user computing device 12 may receive the inputs that identify the product package that is being assembled, while the assembly system 24 may retrieve the relevant data and generate the custom assembly instructions using more computing resources (e.g., cloud computing) than available via the user computing device 12. In any case, after accessing the custom assembly instructions, the user computing device 12 may present the custom assembly instructions vis the display 44.

Figure 5:
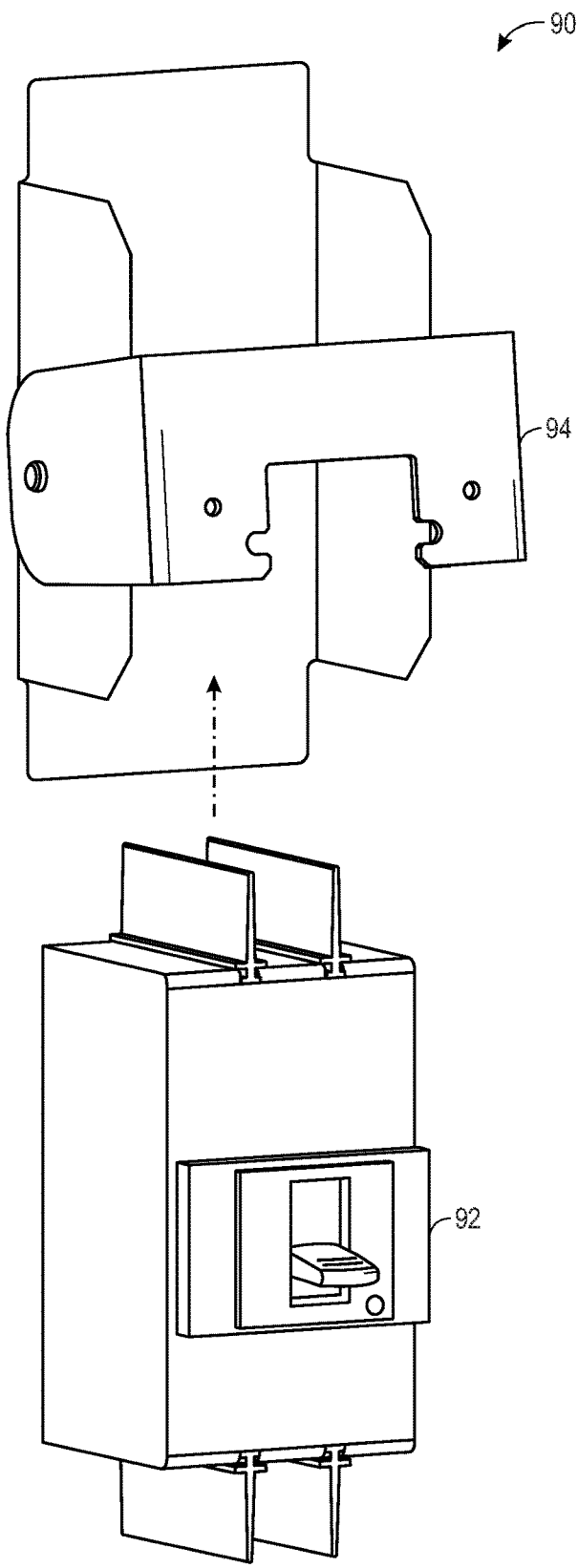
FIG. 5 is an example first visualization that may be part of an instructional video for assembling products of a product package, in accordance with an embodiment.
Figure 6:
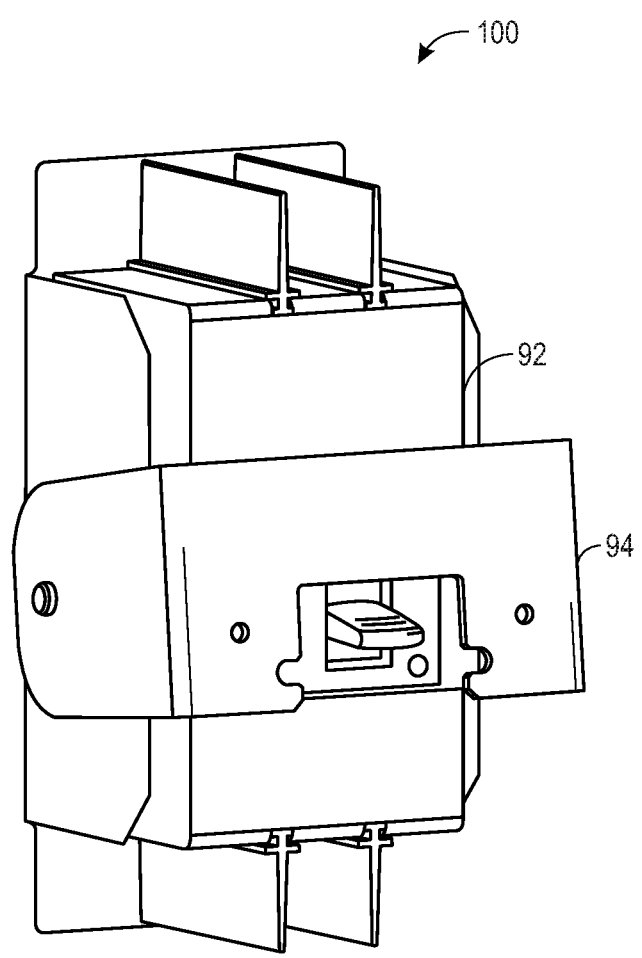
FIG. 6 is an example subsequent visualization that may be part of an instructional video for assembling products of a product package, in accordance with an embodiment.

By way of example, FIGS. 5-7 illustrate a collection of visualizations or a video visualization 90 that illustrates how certain components may be connected to each other. For example, referring to FIG. 5, circuit breaker 92 may be inserted into bracket 94. To illustrate the insertion, visualization 90 may provide a first view of the two components before they are coupled to each other and visualization 100 of FIG. 6 provides a second view of the two components after they are coupled to each other. By presenting the visualizations 90 and 100, the user computing device 12 may enable a user to better understand how to insert the circuit breaker 92 into the bracket 94.

In addition to illustrating how two components may connect to each other, the assembly attributes for each respective component may specify other components that may be used to secure two connecting components together. For example, FIG. 7 includes a visualization 110 that presents a securing plate 112 that may be aligned with the bracket 94 to allow fasteners 114 to secure the bracket 94 to the circuit breaker 92 or the like. As discussed above, the assembly attributes may also provide information with regard to a tool used for performing the connection operation. As shown in the visualization 110, a tool 116 (e.g., flat head screwdriver) is aligned with the fastener 114 and the securing plate 112 to illustrate to the user of the user computing device 12 how the securing plate 112 is connected to the bracket 94.

As mentioned above, the user computing device 12 may present the visualizations 90, 100, and 110 as part of the custom assembly instructions for the respective product package as a video or as a collection of images accompanied by text instructions. It should be noted that regardless of whether the custom assembly instructions are generated as a video or a collection of images, the accompanying instructional information may be provided via text visualizations, audio instructions, or both.

By employing the techniques described in the present disclosure, the user computing device 12 may generate custom assembly instructions for various combination of components that may be part of a product package. Moreover, by having access to the model data for a variety of products, product data for the products, assembly attributes, and other information related to the assembly of different products or components, the user computing device 12 may efficiently generate custom assembly instructions for a variety of product packages and component configurations. Indeed, by distributing the various types of data in the manner described herein, the user computing device 12 may use computing resources more efficiently to generate relevant assembly instructions for a wide variety of product package combinations. As mentioned above, since it is not practical to anticipate every way that a collection of components is planning to be used or the related purpose, the user computing device 12 may generate custom assembly instructions for each individual product package, thereby assisting users in efficiently assembling product packages without requiring that the assembly instructions are provided with the delivery of the product package.

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein.

The invention claimed is:

1. A non-transitory computer-readable medium comprising computer-executable instructions that, when executed, are configured to cause a processor to:

receive one or more inputs from a user via a visualization comprising a list of a plurality of components of an industrial automation product package, wherein the one or more inputs correspond to a selection of a subset of the plurality of components;

retrieve assembly attribute data for each component of the subset of the plurality of components from a first storage component, wherein the assembly attribute data comprises information regarding one or more compatibility properties between two or more of the subset of the plurality of components, wherein the one or more compatibility properties comprises a first indication of compatibility between two or more electrical interfaces of the two or more of the subset of the plurality of components, a second indication of one or more distances between the two or more of the subset of the plurality of components being greater than one or more clearance distance threshold, or both;

retrieve model data for each component of the subset of the plurality of components from a second storage component, wherein the model data comprises a multi-dimensional representation of each component of the subset of the plurality of components;

generate assembly instructions for assembling the subset of the plurality of components together, wherein generating the assembly instructions comprises:

identifying a first component of the subset of the plurality of components configured to electrically interface with a second component of the subset of the plurality of components based on a portion of the assembly attribute data;

determining whether the first component is configured to mechanically interface with the second component based on the portion of the assembly attribute data and the model data; and generating a video configured to animate a first multi-dimensional representation of the first component interfacing with a second multi-dimensional representation of the second component in response to a determination that the first component is configured to mechanically interface with the second component; and display the video via an electronic display.

2. The non-transitory computer-readable medium of claim 1, wherein the one or more inputs comprise an identifier associated with the industrial automation product package.

3. The non-transitory computer-readable medium of claim 2, wherein the computer-executable instructions are configured to cause the processor to query a database using the identifier to determine the industrial automation product package.

4. The non-transitory computer-readable medium of claim 1, wherein the assembly attribute data for each component comprises a list of counterpart components, wherein each counterpart component of the list of counterpart components is configured to connect to a respective component of the subset of the plurality of components.

5. The non-transitory computer-readable medium of claim 1, wherein the assembly attribute data comprises text information indicative of a set of instructions for performing at least a portion of the process for assembling the subset of the plurality of components together.

6. The non-transitory computer-readable medium of claim 1, wherein the assembly attribute data comprises audio information that provides a set of instructions for performing at least a portion of the process for assembling the subset of the plurality of components together.

7. The non-transitory computer-readable medium of claim 1, wherein the one or more compatibility properties further comprises a third indication of compatibility between two or more material compositions of the two or more of the subset of the plurality of components.

8. A method for generating assembly instructions, comprising:

receiving, via a processor, one or more inputs from a user via a visualization comprising a list of a plurality of components of an industrial automation product package, wherein the one or more inputs correspond to a selection of a subset of the plurality of components;

retrieving, via the processor, assembly attribute data for each component of the subset of the plurality of components from a first storage component, wherein the assembly attribute data comprises information regarding one or more compatibility properties between two or more of the subset of the plurality of components, wherein the one or more compatibility properties comprises a first indication of compatibility between two or more electrical interfaces of the two or more of the subset of the plurality of components, a second indication of one or more distances between the two or more of the subset of the plurality of components being greater than one or more clearance distance thresholds, or both;

retrieving, via the processor, model data for each component of the subset of the plurality of components from a second storage component, wherein the model data comprises a multi-dimensional representation of each component of the subset of the plurality of components;

generating, via a processor, the assembly instructions for assembling the subset of the plurality of components together based on the assembly attribute data and the model data, wherein generating the assembly instructions comprises:

identifying a first component of the subset of the plurality of components configured to electrically interface with a second component of the subset of the plurality of components based on a portion of the assembly attribute data;

determining whether the first component is configured to mechanically interface with the second component based on the portion of the assembly attribute data; and generating a video configured to animate a first multi-dimensional representation of the first component interfacing with a second multi-dimensional representation of the second component in response to a determination that the first component is configured to mechanically interface with the second component; and displaying, via a processor, the assembly instructions video via an electronic display.

9. The method of claim 8, wherein generating the assembly instructions further comprises:

identifying one or more pairings between the subset of the plurality of components based on an additional portion of the assembly attribute data;

determining one or more rules for each of the one or more pairings based on the additional portion of attribute data;

determining an order of assembling each of the one or more pairings based on the additional portion of attribute data; and generating the assembly instructions based on the one or more pairings, the one or more rules, and the order.

10. The method of claim 9, wherein the one or more rules comprises one or more conditions in which a portion of the subset of the plurality of components associated with each of the one or more pairings is to be allowed to couple to each other.

11. The method of claim 8, wherein the assembly attribute data comprises one or more tools associated with assembling the subset of the plurality of components together.

12. The method of claim 11, wherein the assembly instructions comprise one or more visualizations associated with assembling the subset of the plurality of components together, and wherein the one or more visualizations includes a representation of the one or more tools.

13. The method of claim 12, wherein the one or more visualizations comprise one or more three-dimensional representations at least a portion the subset of the plurality of components.

14. The method of claim 13, wherein the one or more three-dimensional representations are rotatable.

15. A system for generating assembly instructions, comprising:
at least one database configured to store:
assembly attribute data for each component of a plurality of components of an industrial automation product package being assembled, the assembly attribute data comprising information regarding one or more compatibility properties between two or more of the plurality of components, wherein the one or more compatibility properties comprises a first indication of compatibility between two or more electrical interfaces of the two or more of the plurality of components, a second indication of one or more distances between the two or more of the plurality of components being greater than one or more clearance distance threshold, or both;
model data for each component of the plurality of components, wherein the model data is representative of one or more physical properties of a respective component of the plurality of components, wherein the model data comprises a multi-dimensional representation of each component of the plurality of components; or
both;
a computing device comprising at least one processor configured to:
receive one or more inputs from a user via a visualization comprising a list of the plurality of components of the industrial automation product package, wherein the one or more inputs correspond to a selection of a subset of the plurality of components;
retrieve the assembly attribute data for each component of the subset of the plurality of components from the at least one database;
retrieve model data for each component of the subset of the plurality of components from the at least one database;
generate the assembly instructions for assembling the subset of the plurality of components together based on the assembly attribute data and the model data, wherein generating the assembly instructions comprises:
identifying a first component of the subset of the plurality of components configured to electrically interface with a second component of the subset of the plurality of components based on a portion of the assembly attribute data;
determining whether the first component is configured to mechanically interface with the second component based on the portion of the assembly attribute data; and
generating a video configured to animate a first multi-dimensional representation of the first component interfacing with a second multi-dimensional representation of the second component in response to a determination that the first component is configured to mechanically interface with the second component; and
display the video via an electronic display.

16. The system of claim 15, wherein the at least one database comprises product data for each component of the subset of the plurality of components, wherein the product data comprises information related to configurations for each component, matching counterpart products for each component, accessories used for assembling each component, software related to operating each component, or any combination thereof.

17. The system of claim 15, wherein the assembly attribute data comprises a set of assembly instructions for coupling at least two of the subset of the plurality of components to each other.

18. The system of claim 17, wherein the set of assembly instructions comprises text, audio, or both.

19. The system of claim 17, wherein the set of assembly instructions comprises metadata indicative of locations in model representations of the at least two of the subset of the plurality of components where the at least two of the plurality of components are connected to each other.

* * * * *